United States Patent

[11] 3,601,637

[72] Inventor John R. Spence
Villa Park, Calif.
[21] Appl. No. 49,884
[22] Filed June 25, 1970
[45] Patented Aug. 24, 1971
[73] Assignee North American Rockwell Corporation

[54] MINOR CLOCK GENERATOR USING MAJOR CLOCK SIGNALS
8 Claims, 3 Drawing Figs.

[52] U.S. Cl. .......... 307/304,
307/205, 307/208, 307/265, 307/251, 328/176
[51] Int. Cl. .......... H03k 3/26,
H03k 19/08
[50] Field of Search .......... 307/205,
221 C, 251, 279, 304, 208, 237, 265, 269, 270;
328/54, 63, 173, 176; 330/156

[56] References Cited
UNITED STATES PATENTS

| | | | |
|---|---|---|---|
| 3,275,996 | 9/1966 | Burns | 307/304 |
| 3,350,659 | 10/1967 | Henn | 331/57 |
| 3,382,455 | 5/1968 | Rapp | 307/279 |
| 3,502,908 | 3/1970 | Christensen | 307/205 |
| 3,518,451 | 6/1970 | Booher | 307/208 |
| 3,522,454 | 8/1970 | Gilmour | 307/265 |
| 3,524,077 | 8/1970 | Kaufman | 307/205 |
| 3,536,936 | 10/1970 | Rubinstein et al. | 307/265 |

*Primary Examiner*—Donald D. Forrer
*Assistant Examiner*—R. E. Hart
*Attorneys*—L. Lee Humphries, H. Fredrick Hamann and Robert G. Rogers

ABSTRACT: Selected major phase clock signals (double width) of a multiple phase clocking scheme precharge a bootstrap capacitor, control the rise and fall time of a minor clock signal (single width) which is phase separated from adjacent clock signal phases.

TABLE I

| | | | |
|---|---|---|---|
| $\phi_1$ | $\phi_{3+4}$ | $\phi_{1+2}$ | $\phi_{4+1}$ |
| $\phi_2$ | $\phi_{4+1}$ | $\phi_{2+3}$ | $\phi_{1+2}$ |
| $\phi_3$ | $\phi_{1+2}$ | $\phi_{3+4}$ | $\phi_{2+3}$ |
| $\phi_4$ | $\phi_{2+3}$ | $\phi_{4+1}$ | $\phi_{3+4}$ |

INVENTOR.
JOHN R. SPENCE

BY Robert G. Rogers

ATTORNEY

INVENTOR.
JOHN R. SPENCE

BY
Robert G. Rogers
ATTORNEY

MINOR CLOCK GENERATOR USING MAJOR CLOCK SIGNALS

BACKGROUND OF THE INVENTION

1. Field of the Invention

This invention relates to a minor clock signal generator using major clock signals and, more particularly, to such a generator in which selected major clock signals of a multiple phase clocking scheme control the output signal level and phase separation of the minor clock signal from adjacent clock signal phases.

2. Description of Prior Art

Single width clock signals can be generated by circuits illustrated in U.S. Pat. No. 3,382,455 for a Logic Gate Pulse Generator by A. K. Rapp, issued May 7, 1968, (CL 331–111) and in U.S. Pat. No. 3,350,659 for Logic Gate Oscillator by W. Henn issued Oct. 31, 1967 (CL 331–57). However, in many instances, a single width clock signal, called a minor clock, is often required in a circuit which is being gated by double width multiple phase clock signals, called major clock signals herein. For example, in a multiple phase system, a minor clock may be used to control a sampling gate, isolation gate, write gate, etc. It is important that the major and minor clock signals be phase related in order to synchronize the processing of information in the system.

In the usual application each phase, for example $\Phi_1$, $\Phi_2$, $\Phi_3$ and $\Phi_4$ must be separated to permit the circuit to respond to a clock signal change before being gated by a succeeding clock signal. The $\Phi_1$, $\Phi_2$, etc. signals are minor clock signals whereas the $\Phi_{1+2}$, $\Phi_{2+3}$, $\Phi_{3+4}$ and $\Phi_{4+1}$ clock signals are major clock signals. The major clock signals overlap each other in space.

However, even with the major clock signals, there is a separation between each phase. For example, if the $\Phi_{1+2}$ clock signal has a true interval that can be divided into five-bit time, the true interval of the $\Phi_{2+3}$ clock signal would begin, for example, one bit time after the end of the $\Phi_1$ phase of the $\Phi_{1+2}$ clock signal.

In addition to having a phase separation and phase relationship to the major clock signals, the minor clock signal usually must have a predetermined maximum voltage or signal level. The signal level is determined after the function of the requirements of a particular circuit which is using the minor clock signal. In the systems described by the patents, and in other field effect transistor circuits, the voltage level can be controlled by properly selecting the supply voltage level. However, in many instances it is not practical to increase the voltage supply level to overcome the threshold losses of the field effect transistor circuit. As is well known, the threshold loss of a field effect transistor may be as much as 6 volts.

Therefore, a minor clock signal generator is required which can provide an output signal having a required signal level without the necessity for increasing the supply voltage and which has the required phase relationship to major clock signals of a multiple phase clocking scheme.

SUMMARY OF THE INVENTION

Briefly, the invention comprises a minor clock signal generator which is controlled by a plurality of phase related major clock signals of a multiple phase clocking scheme. The particular phase of the minor clock signals, i.e. $\Phi_i$, $\Phi_{i+1}$, $\Phi_{i+2}$, etc. where $i$=1, is a function of the major clock signals selected. For example, the phase and pulse width of $\Phi_1$ are controlled by $\Phi_{1+2}$ and $\Phi_{4+1}$ major clock signals.

In addition, another of the major clock signals is used to control the output signal level of the minor clock signal. In the preferred embodiment, the other major clock signal provides the initial charge on a bootstrap (feedback) capacitor of an output load field effect transistor.

Therefore, it is an object of this invention to provide a minor clock signal generator using major clock signals.

Another object of this invention is to provide a circuit in which the separation between a minor clock signal and major clock signals of a multiple phase clocking scheme are controlled by the phase separation of the major clock signals.

A further object of this invention is to provide a minor phase clock signal generator in which there is a phase separation between each of the phases of the minor and major clock signals.

A still further object of this invention is to provide a minor phase clock signal generator which has a phase separation from other clock signal phases and in which the phase separation is controlled as a function of selected multiple phase major clock signals.

A still further object of this invention is to provide a minor clock signal generator having a phase determined by selected major clock signals.

A still further object of this invention is to provide a single width clock signal generator in which double width clock signals control the phase of the single width clock signal; the separation between adjacent phases of other single width clock signals; and the signal level of the minor clock signals.

A still further object of of this invention is to provide a single width clock signal generator using double width clock signals which dissipate relatively reduced amounts of power, has a required output signal level, and a relatively high speed response.

These and other objects of the invention will become more apparent when taken in connection with the description of the drawings, a brief description of which follows:

DESCRIPTION OF THE PREFERRED EMBODIMENTS

Figures 1, 3:
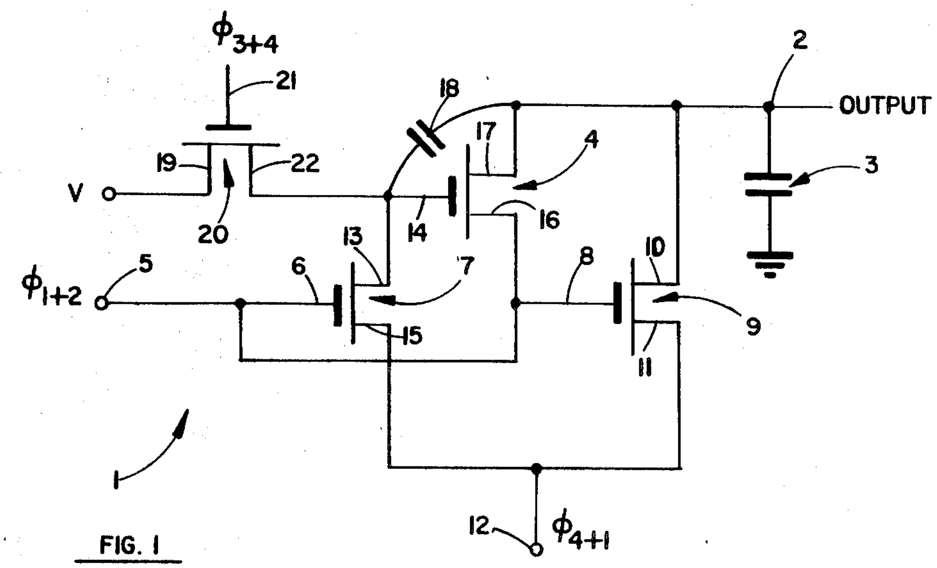
FIG. 1 is a circuit diagram of one embodiment of a minor (single phase width) clock signal generator gated with major (double phase width) clock signals.
FIG. 3 is a table showing the relationship of minor clock signals to major clock signals.

FIG. 1 is a schematic diagram showing one embodiment of a minor (single phase width) clock signal generator 1. For purposes of describing one embodiment, $\Phi_1$ is selected as the single width clock signal generated by the circuit. The $\Phi_{1+2}$, $\Phi_{3+4}$ and $\Phi_{4+1}$ major (double phase width) clock signals are required to generate the minor clock signal $\Phi_1$, as will be described subsequently.

The generator 1 includes output 2 having load capacitance 3. The output capacitor 3 represents the capacitance of conductors, interelectrode capacitance, other field effect transistors, distributed, stray and other inherent capacitances of the load connected to the output 2.

Load field effect transistor 4 is connected between the output and clock signal $\Phi_{1+2}$ on input 5. The clock signal input 5 is also connected to the gate electrode 6 of field effect transistor 7 and gate electrode 8 of field effect transistor 9.

Field effect transistor 9 has its source electrode 10 connected to output 2 and its drain electrode 11 connected to the $\Phi_{4+1}$ clock signal on input 12. Field effect transistor 7 has its source electrode 13 connected to gate electrode 14 of field effect transistor 10 and its drain electrode 15 connected to the $\Phi_{4+1}$ clock signal on input 12.

The drain electrode 16 of field effect transistor 4 is connected to the $\Phi_{1+2}$ clock signal on input 5 and its source electrode 17 connected to the $\Phi_{1+2}$ clock signal on input 5 and its source electrode 17 connected to output 2. Feedback, or bootstrap, capacitor 18 is connected between source electrode 17 and gate electrode 14 of field effect transistor 4 for "-feeding back" a voltage from the source electrode 17 and the output to the gate electrode 14 as described subsequently in describing the operation of the FIG. 1 circuit.

Voltage V on drain electrode 19 of field effect transistor 20 is gated to one side of capacitor 18 and gate electrode 14 of field effect transistor 4 by clock signal $\Phi_{3+4}$ which is connected to the gate electrode 21 of field effect transistor 20. Source electrode 22 of field effect transistor 20 is connected to the gate electrode 14 and to capacitor 18.

Although the voltage level V on drain electrode 19 may be a fixed voltage level, it may also be supplied by an alternating signal such as another clock signal. In that case, the FIG. 1 circuit would provide an output as a function of the clock signal appearing on drain electrode 19. For purposes of describing a preferred embodiment, however, a voltage on drain electrode 19 is assumed to be a fixed voltage, V.

The FIG. 1 circuit can be implemented by P channel field effect transistors such as MOS devices. In that case, the clock signals would have a negative interval representing logic 1 or a true state, and an electrical ground interval representing logic 0, or a false state. The supply voltages would be negative. In other embodiments, N channel devices could be used such that the true state of the clock signals would be a positive voltage level. In other embodiments, N and P channel devices with mixed clock signals and voltage levels could be used.

Figure 2:
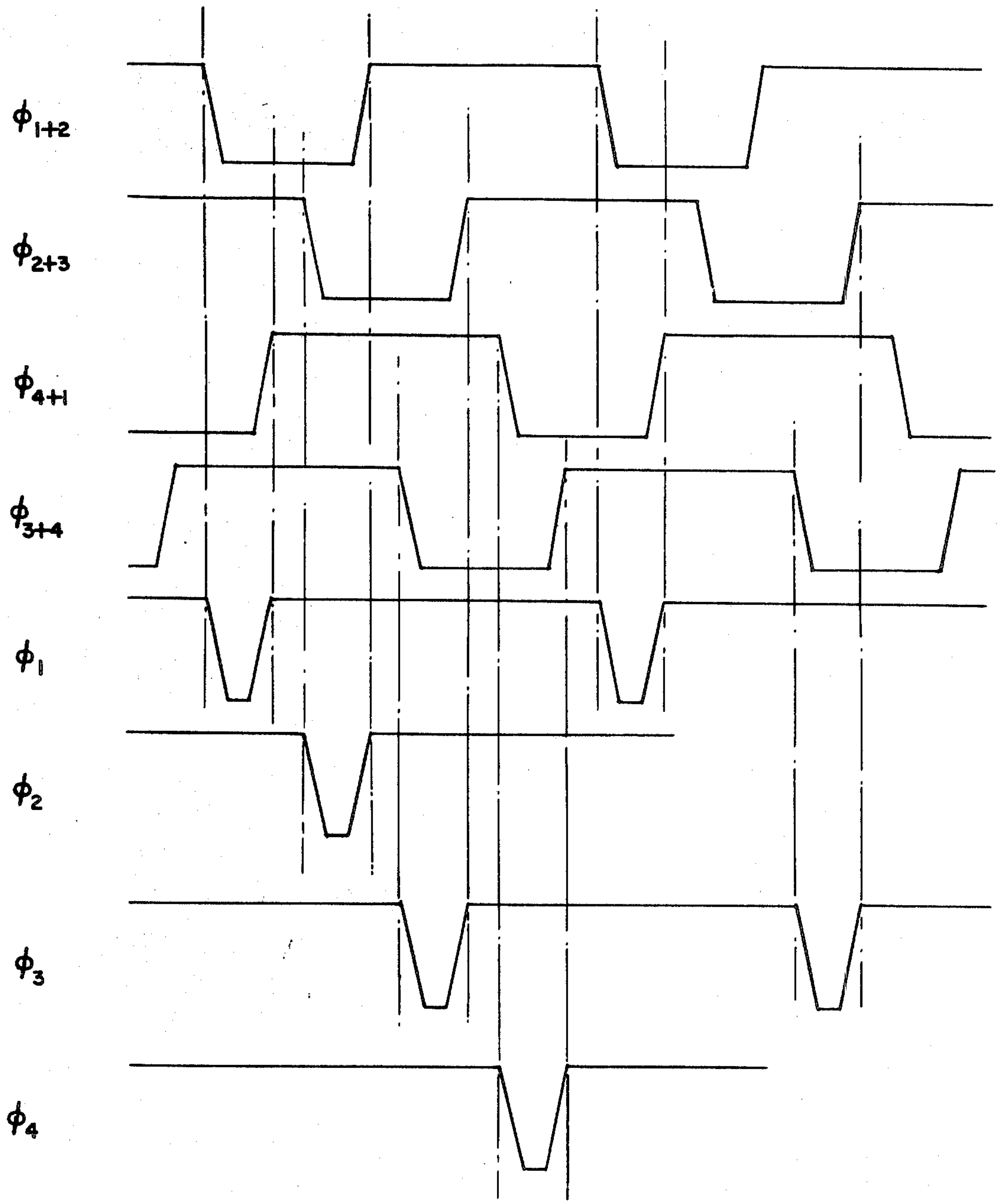
FIG. 2 is a signal diagram showing the signals taken at selected points in the FIG. 1 circuit.

The operation of the circuit can best be understood by referring to FIGS. 1 and 2. As shown in FIG. 2, during the true interval of the $\Phi_{3+4}$ major clock signal, transistor 20 is turned on for charging capacitor 18 towards the voltage level V. As a result, transistor 4 is turned on and the output 2 is connected to ground through transistor 4. The electrical ground is provided since the $\Phi_{1+2}$ clock signal on input 5 is at electrical ground during the $\Phi_{3+4}$ true period.

Transistor 7 remains off during the $\Phi_{3+4}$ true interval and transistor 9 remains off until the end of the $\Phi_3$ phase. Although the $\Phi_{4+1}$ major clock signal becomes true during the $\Phi_4$ phase, the gate electrode 8 of transistor 9 is still connected to electrical ground since $\Phi_{1+2}$ is false during that phase time. As a result, transistor 9 remains off until the $\Phi_1$ phase of the $\Phi_{1+2}$ major clock signal which coincides with the $\Phi_1$ phase of the $\Phi_{4+1}$ major clock signal.

When the $\Phi_{1+2}$ clock signal becomes true, during the $\Phi_1$ phase, transistors 7 and 9 become conductive and the output 2 is driven toward the clock signal level minus a threshold drop through transistor 9. However, since the output voltage changes from electrical ground towards the $\Phi_{4+1}$ clock signal level, the voltage across capacitor 18 changes a like amount for substantially increasing the voltage on gate electrode 14 of transistor 4.

Transistor 20 is turned off during the $\Phi_{1+2}$ true interval since $\Phi_{3+4}$ is false so that gate electrode 14 is isolated from a voltage V. Therefore, as a result of the feedback from output 2 across capacitor 18 to gate electrode 14, the conduction transistor 4 is substantially enhanced and the output is driven all the way to the clock signal level of the $\Phi_{1+2}$ clock appearing on the drain electrode 16 of transistor 4. The capacitor 18 comprises a bootstrap, or feedback, capacitor for the output load transistor 4.

Although transistor 7 is on during the $\Phi_1$ time of the $\Phi_{1+2}$ clock signal, it does not effect the operation of the circuit. At the end of the $\Phi_1$ phase time of the major clock signals $\Phi_{1+2}$ and $\Phi_{4+1}$, input terminal 12 becomes electrical ground as shown in FIG. 2. However, transistor 7 remains on since the $\Phi_{1+2}$ clock signal is true and gate electrode 14 is connected to electrical ground for discharging capacitor 18.

When electrode 14 of transistor 4 is grounded, transistor 4 is turned off and the output 2 is connected to ground through transistor 9. Therefore, the output remains true for one phase time, i.e. $\Phi_1$. As a result, the output 2 generates a minor clock signal as a function of the major clock signals used in gating the FIG. 1 circuit. The $\Phi_{3+4}$ major clock signal precharges capacitor 18 for enabling the bootstrap, or feedback, circuit to boost the output to the voltage level of the clock signal $\Phi_{1+2}$ without field effect transistor threshold losses. The clock signal $\Phi_{1+2}$ and the $\Phi_{4+1}$ clock signals determine the rise and fall time of the $\Phi_1$ clock. In other words, the $\Phi_1$ clock becomes negative when the $\Phi_{1+2}$ clock signal goes negative and the $\Phi_1$ clock signal becomes false when the $\Phi_{4+1}$ clock signal goes false.

The output 2 and, therefore, the $\Phi_1$ clock signal does not exactly follow the rise and fall times of the $\Phi_{1+2}$ and the $\Phi_{4+1}$ clock signal due to the RC time constant comprising the load capacitance and field effect transistors 4 and 9. If the field effect transistors 4 and 9 are made relatively large, i.e. if the *w./l.* ratios of the transistors are large for providing relatively low resistance devices, the rise and fall time of the $\Phi_1$ clock signal nearly approximates the rise and fall time of the major phase clock signals.

It is also pointed out that since the output signal level does not depend upon the resistance ratio of any of the field effect transistors comprising the FIG. 1 circuit, the only power dissipated by the circuit is due to the charge and discharge of the capacitors 3 and 18. Since the transistors 4 and 9 are relatively large, the circuit has a relatively high speed response to the multiple phase clock signals. Because the response is relatively fast, the separation between the phases is maintained. In other words, if the rise and fall time of the output and, therefore, the minor clock signal had been relatively slow, it would have been possible for an output signal to overlap an adjacent phase. In that case, the output could provide erroneous gating information.

Table 1 shown in FIG. 3 illustrates how other minor phase clock signals can be generated by selecting different major clock signals for gating or controlling the FIG. 1 circuit. For example, the $\Phi_2$ minor clock signal can be generated by the FIG. 1 circuit by providing the $\Phi_{4+1}$ clock on the gate electrode 21 of field effect transistor 20. In that case, the $\Phi_{2+3}$ clock signal would be provided at input 5 and the $\Phi_{1+2}$ clock signal at input 12. Similarly, the $\Phi_3$ minor clock signal can be generated by selecting the $\Phi_{1+2}$, $\Phi_{3+4}$ and $\Phi_{2+3}$ major clock signals for electrodes 21, 6 and terminal 12 of FIG. 1 circuit. $\Phi_4$ can be generated by selecting the major clock signals shown.

I claim:

1. A minor phase clock signal generator having an output and using major phase clock signals, said generator comprising, a first load field effect transistor means for setting the output to one logical level during the corresponding logical level of a first major phase clock signal, said first load field effect transistor means being connected between said output and said first major phase clock signal, a second field effect transistor connected between the output and a second major phase clock signal for setting the output to a second logical level during a corresponding logical level of said second major phase clock signal, a third field effect transistor connected between said first load field effect transistor means and said second major phase clock signal and having its gate electrode connected to said first major phase clock signal for turning said first load field effect transistor means off at the end of the first logical level of said second major phase clock signal.

2. The generator recited in claim 1 wherein said first and second major clock signals have overlapping phases.

3. The generator recited in claim 1 wherein said first load field effect transistor means and said second field effect transistor are relatively low resistance devices whereby the signal transitions of the output from one logical level to the other logical level closely approximate the transitions of said first and second major phase clock signals between said logic levels and whereby the separation of said minor phase clock signal from adjacent phases of said major phase clock signals is maintained.

4. The generator recited in claim 1 wherein said first load field effect transistor has its drain electrode connected to said first level phase clock signal and its source electrode connected to said output, said second and third field effect transistors have their gate electrodes connected to said first major phase clock signal and their drain electrodes connected to said second major phase clock signals, said source electrode of said second field effect transistor being connected to said output and said source electrode of said third field effect transistor being connected to the gate electrode of said first load field effect transistor means.

5. The generator recited in claim 1 and further including a feedback capacitor connected between the output and the gate electrode of said first load field effect transistor means for feeding back the output voltage to the gate electrode during said first logical level of the first major phase clock signal for boosting the output voltage to the voltage level of said first major phase clock signal, a fourth field effect transistor connected between an input voltage level and the common connection of said gate electrode and said capacitor for precharging said capacitor and for initially turning said first load field effect transistor means on before said output voltage is fed back.

6. The generator recited in claim 5 wherein the gate electrode of said fourth field effect transistor is connected to a third major phase clock signal, said first, second and third major phase clock signals being related in phase as a function of the phase of the minor phase clock signal.

7. The generator recited in claim 6 wherein when a phase 1 minor phase clock signal is required, said first and second major phase clock signals are $\Phi_{1+2}$ and $\Phi_{4+1}$, respectively, and said third major phase clock signal is $\Phi_{3+4}$, when a phase two minor phase clock signal is required, said first and second major phase clock signals are $\Phi_{2+3}$ and $\Phi_{1+2}$, respectively, and said third major phase clock signal is $\Phi_{4+1}$; and where a third minor phase clock signal is required said first and second major phase clock signals are $\Phi_{3+4}$ and $\Phi_{2+3}$, respectively, and said third major phase clock signal is $\Phi_{1+2}$ and when a fourth phase clock signal is required, said first and second major phase clock signals are $\Phi_{4+1}$ and $\Phi_{3+4}$, respectively, and said third major phase clock signal is $\Phi_{2+3}$.

8. A minor phase clock signal generator having an output and an input connected to a voltage level, said minor phase clock signal generator being gated by selected multiple phase clock signals, said generator comprising, a first field effect transistor having a gate electrode and having its source electrode connected to said output, and its drain electrode connected to a first major phase clock signal, a capacitor connected between the output and the gate electrode of said first field effect transistor for feeding back the output voltage during a selected interval for enhancing the conduction of said first field effect transistor, a second field effect transistor having its gate electrode connected to the first major phase clock signal, its source electrode connected to the output and its drain electrode connected to a second major phase clock signal, said first and second major phase clock signals having an overlapping phase, a third field effect transistor having its gate electrode connected to the first major phase clock signal, its source electrode connected to the gate electrode of said first field effect transistor, and its drain electrode connected to the second major phase clock signal, a fourth field effect transistor having its gate electrode connected to a third major phase clock signal, its drain electrode connected to the input and its source electrode connected to the gate electrode of said first field effect transistor, said third major phase clock signal having a phase which overlaps a phase of the second major phase clock signal without overlapping a phase of the first major phase clock signal.